3,194,750
PROCESS FOR SEPARATING NONFERROUS
METALS FROM STEEL
Gustav Knippers, Auf dem Saarnberg 18,
Mulheim-Saarn, Germany
Filed June 21, 1961, Ser. No. 127,425
Claims priority, application Germany, Jan. 28, 1961,
K 42,766
6 Claims. (Cl. 204—146)

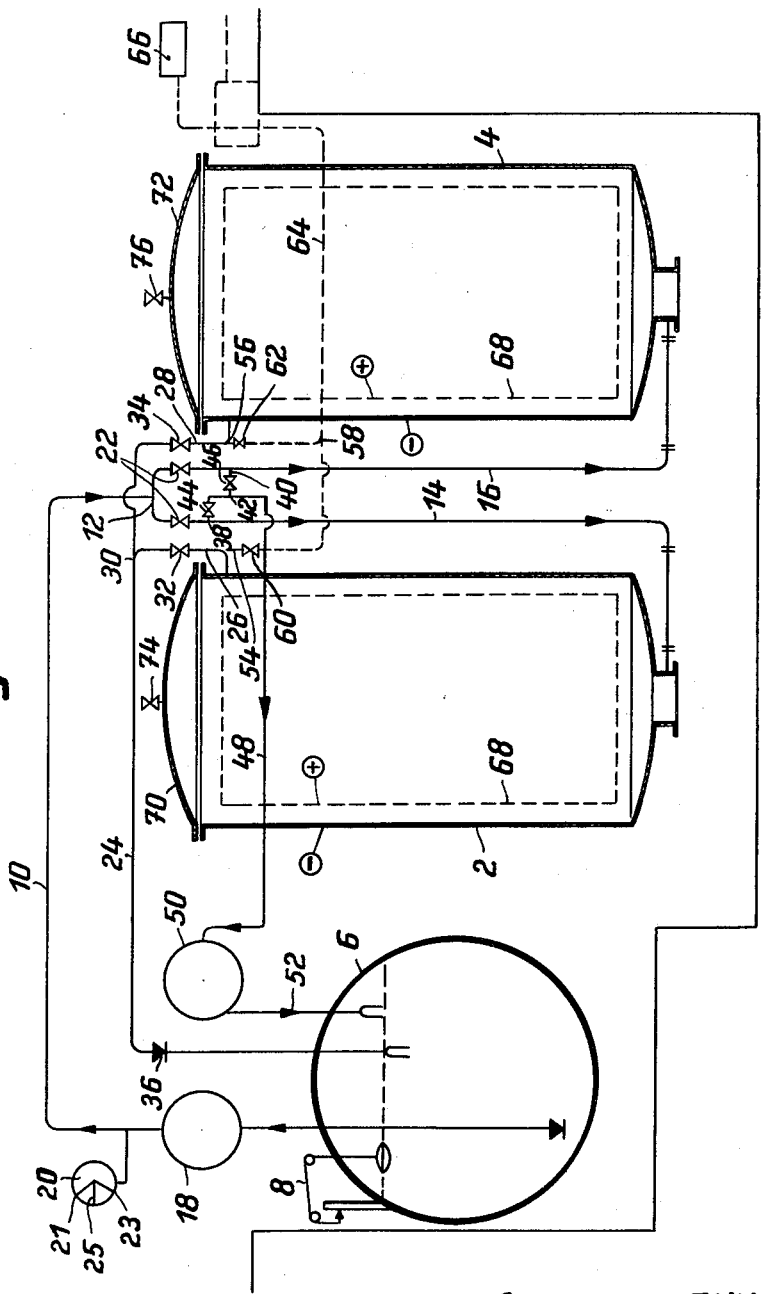

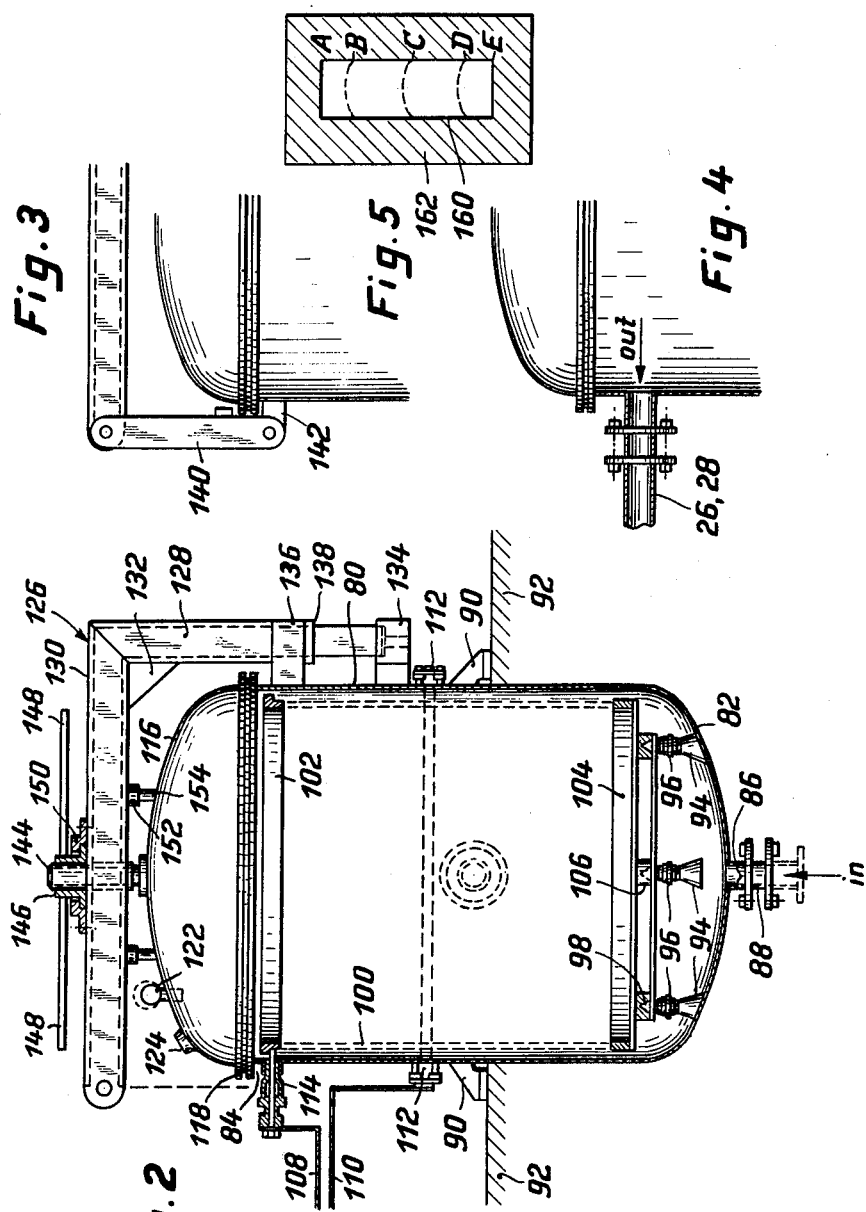

The invention relates to a process and an apparatus for the separation from steel of surface coatings of nonferrous metals, and is particularly applicable to a process and an apparatus for the de-tinning of tin-plate.

For a long time tin-plate has been a preferred starting material for the production of containers for protecting food. The tin-plate, the steel or other plate of which has been plated, usually electrolytically, by a layer of tin, is formed into food-containers in particularly large quantities so as to fulfill present requirements.

Since the food containers as a rule can only be used once, the very abundantly accumulated used material contains a large amount of tin in addition to the sheet steel utilisable in the Siemens-Martin furnace, and for a long time therefore processes have been known which can separate the tin from the steel sheet.

One of the oldest of these processes depends on electrolysis in an alkaline solution. By this process the steel sheet to be de-tinned is treated in a 9% sodium lye at 60°–70° C. at a cell loading of 1.5 volts and 1500 amperes.

This process is subject to a number of disadvantages, which is why it has not been extensively employed. It was then necessary for the material to be de-tinned to be placed in the treatment vessel unpressed, whereby the space in the vessel could not be economically used. It was even necessary for the material to be turned over from time to time so that as complete as possible a wetting with treatment liquid of all the material surfaces to be de-tinned should be obtained and so that polarization of ion concentration should be prevented. However, at the lateral turning over of the cage the treatment liquid sought the path of least resistance and the wetting as well as the ion movement was thus not obtained.

A further disadvantage was that the treatment vessel was open and due to the high temperature of the treatment bath considerable loss of heat and liquid had to be tolerated. At a treatment temperature of 70° in the course of 24 hours a loss of 5% of liquid was sustained, which in a 300 ton apparatus occasioned the additional use of 2000 litres of heating oil.

A further disadvantage of the old process was that atmospheric carbon dioxide was absorbed, so that much carbonate was formed and a large consumption of sodium hydroxide and precipitation of stannous ions occurred. The carbonate formed made the treatment fluid very soon unusable, so that this had to be renewed after a very short time. Provision of more calcium as calcium oxide was also extraordinary complex and necessitated additional plant facilities.

Because of the small utilisation of space, several treatment vessels were needed for relatively small yields, into which long current leads and many contacts had to be built in. Thus the current loss was remarkably high so that high current intensities were required. The small space utilisation also caused the amount of work occasioned by the replacement of the anode cages to be too large in relation to the yield. The work in closed rooms in high atmospheric humidity eventually became extremely unhealthy.

In present-day technical practice the older process for the de-tinning of tin-plate has for a long time been abandoned in favour of other processes, of which the chlorine gas or chlorine de-tinning process is particularly to be noted. In this process dry pieces of tin-plate are acted upon with dry chlorine gas in large tightly enclosed reaction chambers so that the tin is transformed into liquid stannic tetrachloride ($SnCl_4$). The steel of the tin-plate remains unchanged, so long as the reaction temperature is maintained below 3° C. However, by this process de-tinning is only possible of tin-plate pieces or containers which have not been compressed, so that it suffers from the disadvantages already described. Moreover, pieces of tin-plate coated with a protective layer of paint can by this means be only very incompletely de-tinned, in that the chlorine only with difficulty reaches the layer of tin lying under the layer of paint. Furthermore, the stannic tetrachloride formed by the action of the chlorine cannot be completely removed from the inner spaces of the used container, e.g. milk containers, which during their use generally are only provided with small perforations in the ends, since the stannic tetrachloride is formed as non-aqueous liquid. A loss of tin is thus on the one hand suffered; and on the other hand there results a very serious disadvantage in the later metallurgical utilisation of the de-tinned sheet pieces, e.g. as steel scrap in the Siemens-Martin furnace.

One thus turns again in the present age to the de-tinning of tin-plate material by a process based on electrolysis in alkaline solution, and good success has been obtained by a newly compounded treatment liquid. This liquid is based on an aqueous alcohol solution particularly comprising lower alcohols with up to 3 carbon atoms, which are mixed with alkali hydroxides or alkali carbonates so as to raise the conductivity. It has thus most surprisingly been shown that the alkali need not be added as in previous processes in the form of alkali hydroxide; it is on the contrary possible and very advantageous to use the cheaper carbonate, soda, or potash. As examples of the lower alcohols, methyl, ethyl, or propyl alcohols may be used, especially methyl alcohol in the form of methanol. The addition amounts to 5–20% by volume, according to the state of the materials to be de-tinned. To this solution are added alkali carbonates, for example 5% of potash and 10% of soda; or hydroxide may alternatively be used instead of these.

The use of such a treatment fluid provides several advantages. The most important of these advantages is that by the use of this treatment fluid it is possible to directly treat the pieces of sheet pressed together in packets for the purpose of transport, so that these packets do not have to be subjected to a special disassembly process. The methanol has the particular advantage that it renders the layers of paint which cover the inside of containers or of pieces of sheet permeable to tin transport, and also loosens the gum used to attach labels to containers, so that de-tinning is also ensured in this case. The alcohol contained in the treatment liquid also has another favourable action since it possesses a greater affinity than the remaining steel sheet for the oxygen formed at the anode, and thus the steel is not oxidised by the oxygen which is very aggressive at the moment of its formation, and consequently its quality is retained for later use It is then advantageous to subject the treatment liquid containing the pieces of tin-plate to a vacuum before the electrolysis process proper. Thus the small amounts of air contained in the compressed packets are expanded and are released at least in part from the cavities formed, which consequently are filled with treatment fluid. In this way the tin layers of the compressed inner walls are each attacked by the subsequent electrolysis. To be sure, the vacuum treatment has hitherto required a separate working step, which necessitates placing the materials to be treated and the treatment liquid in a pressure vessel.

Furthermore, the use hitherto of this new treatment fluid has been disadvantageously affected by the fact that the treatment vessel is open and so especially the alcohol content of the liquid decreases comparatively quickly and must be replenished.

The present invention is based on the task of removing the disadvantage of the earlier process which was based on electrolysis in alkaline solution, particularly for detinning pieces of tin-plate, and also of increasing the efficiency and the yield of the process.

This task is carried out according to the present invention in that the electrolysis process is carried out in a closed airtight vessel, wherein at the beginning of the process a vacuum is set up above the material to be treated contained in the electrolysis bath, and thereafter during the entire process the bath liquid in the vessel is subjected recurrently to overpressure and reduced pressure.

After this removal of most of the air contained in the small cavities in the compressed packets, the treatment liquid is next subjected to normal pressure and then, under increased pressure and strong compression, the small amount of air yet remaining in the cavities is pressed inwards so that the surfaces are almost completely wetted. The recurrent change in pressure also includes a movement of fluid inside the packets, which considerably increases the movement of ions.

Furthermore, by the process according to the invention the operation which formerly required a separate working step and which consists of subjecting the compressed pieces of tin-plate to a vacuum inside the treatment liquid can be carried out in a pressure vessel, which is arranged also to serve as the treatment vessel for the electrolysis; the course of the treatment is thus substantially hastened. In the same way, after the electrolysis process the usual drying operation can be carried out also by application of a vacuum in the same treatment vessel in which the electrolysis has taken place.

The invention possesses a further advantage in that no treatment liquid, and particularly no alcohol, can any longer evaporate from the closed airtight vessel. Thus the treatment liquid can be used unaltered over a long period, and the consumption of heat is also maintained at a minimum. By the use of alkaline hydroxide there is no longer any danger of carbonate formation by the absorption of carbon dioxide from the atmosphere. Furthermore the humidity in the closed rooms is not higher than normal, so that the previous unhealthiness of the labour in such factories is overcome.

Since the compressed pieces of material are now directly treated, considerably smaller treatment vessels suffice for the same yields, so that the current leads can be considerably shorter and the contact time is reduced. This implies a smaller current loss and consumption of material. The use of, for example, only two vessels causes substantially less expenditure of energy than the use of several for the same result.

According to another feature of the process according to the invention, at least two airtight closeable vessels are connected to each other and in one installation, and electrolysis process is then timed in the individual vessels in this way that no two vessels have to be opened and attended to at the same time. Thus the expenditure of labour in opening and closing the vessels, changing over the cages and cleaning out the vessels can be further reduced.

An apparatus for carrying out the process of the invention is according to a further feature of the invention characterized by at least one airtight closeable vertical treatment vessel, a heatable reservoir for the bath liquid and two pipelines connecting the vessel with the reservoir. In the first line, which opens into the lower part of the treatment vessel, a pump is arranged to supply liquid to the treatment vessel and in a second line, which opens into the upper region of the treatment vessel, a pressure throttle device is incorporated to control the pressure towards the reservoir; the second line is connectable between the treatment vessel and reduction valve to a vacuum pump. From this apparatus the recurrently changing pressure of the treatment liquid according to the foregoing invention is obtained by the action of a pump in a closed vessel system against a throttle device, for example against a reducing valve or a diaphragm plate. According to a further feature of the invention, the alternating changes of pressure are controlled by means of an adjustable contact pressure gauge. This contact pressure gauge switches off the pump when a predetermined adjustable excess is reached, and switches the pump on again when the pressure in the vessel has been released across the throttle device. The frequency of the successive pressure changes is adjusted by means of the setting of the throttle device.

Further advantages and characteristics of the invention are apparent from the following description in conjunction with the attached drawings, in which:

FIG. 1 is a schematic representation of a preferred embodiment of an apparatus according to the invention for carrying out the process according to the invention;

FIG. 2 is a side view partly in section of a treatment vessel;

FIG. 3 is a side view of an upper part of a treatment vessel;

FIG. 4 is a side view partly in section of another upper part of a treatment vessel;

FIG. 5 is a schematic representation to explain the effectiveness of the process according to the invention.

The preferred embodiment of the apparatus according to the invention comprises two treatment vessels. In FIG. 1 two such vessels 2 and 4 are shown schematically, a more detailed illustration of their construction being shown in FIG. 2. The apparatus also comprises a reservoir 6 for the treatment liquid. The reservoir 6 is heatable by suitable means and is also provided with a float mechanism 8 for recording the level of the liquid.

From the reservoir 6 there runs a pipeline 10 which divides at 12 into two sub-pipelines 14 and 16 opening into the lower part of the vessels 2 and 4. If more than two treatment vessels are provided, then a corresponding number of sub-pipelines run from the pipeline 10. The line 10 opens into the reservoir 6 at a comparatively low level; between the reservoir and the junction point 12 a pump 18 and a pressure gauge 20 are connected in series. The pump 18 preferably maintains an output of 400 litres per minute. A valve 22 is inserted in each one of the pipes 14 and 16.

The treatment vessels 2 and 4 are also connected to the reservoir 6 through a second pipeline 24; from the upper region of the vessels 2 and 4 run lines 26 and 28, which combine at 30 and then form the pipeline 24. Valves 32 and 34 are inserted in the lines 26 and 28 respectively before the junction 30. Between the junction 30 and the discharge of the pipeline 24 into the vessel 6 there is inserted in the line 24 a throttle device 36, for example a reducing valve or a diaphragm plate. The pipeline 24 dips from above only a relatively small distance into the reservoir, up to about half the height of the vessel.

Between the valves 22 and the discharge of the lines 14 and 16 into the vessels 2 and 4, lines 38 and 40 branch off, which lines contain valves 44 and 45 before they unite at the point 42 to form the common line 48. The line 48 is the suction line of a pump 50, of which the pressure line 5 opens into the reservoir 6 and only extends therein a relatively short distance. The pump 50 preferably has an output of about 800 litres per minute.

Between the valves 32 and 34 and the departure of the lines 26 and 28 from the treatment vessels 2 or 4 lines 54 and 56 branch off from these lines and unite at a point 58. Between the branching-off points from the lines 26 and 28 and the junction point 58 valves 60 and 62 are inserted in the lines 54 and 56. The lines 54 and 56 unite to form the line 64, which leads to a vacuum pump 66.

The cathode of the apparatus is formed from the wall of the treatment vessels 2 and 4, while the anode is constructed in the form of an iron cage which is inserted in the treatment vessels. These cages are indicated on FIG. 1 by the broken lines 68. The treatment vessels have removable covers 70 and 72 in which valves 74 and 76 are provided, discharging to the ambient.

The construction of a single treatment vessel is shown in FIG. 2. The vessel is formed from a vertical cylindrical middle-piece 80, which is fixed to a lower cap 82. A circular flange 84 is attached to the upper end of the middle section 80. The lower cap 82 bears a co-axial entry union to which the pipe 14 or 16 is attached via a plastics joint 88. Brackets 90 are fixed to the sides of the middle-piece 80 and support the vessel on the substrate 92.

To the inside of the lower cap 82 supports 94 are attached which terminate above in insulation pieces 96 and are each provided with a sharp guide piece 98.

The anode cage 100 serves to hold the tin plate or other materials to be treated. The measurements of this cage are so adjusted that it can be placed inside the middle-piece 80, and in its working position the cage nowhere touches the middle-piece. The cage 100 is formed, for example, from bar or sheet iron, and at its upper end is surrounded by a copper hoop 102 while at its lower end there is a circular band 104. Locating elements 106 project from the lower end of the cage; these elements are arranged for engagement with the guide pieces 98 and their shape conforms with the shape of the guide pieces. There are preferably provided three—one to each 120° of the circle-oppositely spaced supports 94 and correspondingly three locating elements 106, although more supports can be provided if required. The cage may alternatively be suspended from its upper rim by suitable supporting links.

The current for the cathode and the anode is provided via the leads 108 and 110. The lead 110 passes to a copper hoop 112 which surrounds and is fixed to the central portion of the middle-piece 80; this hoop 112 corresponds with the hoop 102 of the anode cage 100. The lead 108 passes through an electrically insulating sleeve 114 in the upper region of the vessel wall, and is connected to the copper hoop 102 of the anode cage.

The leads 108 and 110 are attached to the positive and negative poles of a direct-current generator. If several treatment vessels are provided in one apparatus, the electrodes of the vessels are preferably connected in series. Thus, in the embodiment of FIG. 1 which comprises two autoclaves, the anode cage of one vessel is attached to the positive pole of the generator while the cathode of this vessel is attached to the anode cage of the second vessel and the cathode of the second vessel is connected to the negative pole of the generator.

The airtight treatment vessels are closed by means of the lower cap 82 and the corresponding cover 116. The cover 116 bears a flange 118, corresponding to the flange 84, and an airtight washer 120 is arranged between these flanges in a known manner. The cover 116 is pierced by an intake valve 122 and for ease of handling bandgrips 124 are provided.

For the purpose of the airtight closure of the treatment vessels a pressure device is provided for the cover 116. This device comprises a frame 126, which consists of a vertical member 128 and a horizontal member 130. Each of these members is rigidly attached to each other and is reinforced by a bracket 132. The member 128 rests on a thrust bearing 134 and passes through a pivot bearing 136, so that below the bearing 136 a setting ring 138 can be applied against this bearing. The frame 126 is thus moveable away from the vessel; it can be held in its closed position, as is shown in FIG. 3, by means of a locking arm 140 attached to the free end of the frame and mounted on a bearing piece 142 projecting from the vessel wall.

The member 130 of the frame 126 bears a screw 144 which in the closed position of the framework 126 is co-axial with the vessel. The screw 144 co-operates with a nut 146, and the two are fixed together to the capstan-bar 148. The nut 146 grips below it a flange 150 fixed to the member 130. By the swivelling of the bar 148 and thus of the nut 146, the screw 144 moves in the vertical direction, so that by right-hand rotation it bears down on the cover which is thus held fast to the vessel wall. Bushes and bolts 152 and 154 are arranged on the frame 126 and the cover 116 respectively so as to guide the alignment of the parts during rotation of the screw 144.

On FIG. 4, the situation of the union for the pipeline 26 or 28 is shown in relation to the upper edge of the treatment vessel. The attachment between the pipeline and the union is executed in a similar manner at the lower orifice of the vessel.

The process according to the invention proceeds in the following manner.

Initially, all pumps are switched off, all valves are closed and the treatment vessels are open. The anode cage filled with the material to be treated hangs or stands in the vessel and is joined to the positive pole of the generator or is attached in the previously described series connection.

As the first step, the covers 70 and 72 (see FIG. 1) are closed and then the valves 22, 32 and 34 are opened. The pump 18 is now started; it fills the vessel with the treatment liquid stored in the supply vessel through the pipeline 10 and the pipeline 14 and 16, until by means of the return through the pipelines 26 or 28 and 24 a predetermined level has been attained in the vessels. The valves 22, 32 and 34 are then closed and the pump 18 is disengaged.

The characteristic treatment process now commences: The valves 60 and 62 are opened, the vacuum pump 66 is set in action and a vacuum of about 400 mm. Hg is obtained in the treatment vessels 2 and 4 above the liquid. The valves 60 and 62 are then again closed and the vacuum pump 66 is shut off.

After the application of the vacuum the recurrent change of pressure of the treatment liquid begins and continues during the entire electrolysis process. The valves 22, 32 and 34 are opened, and the pump 18 is started. It again pumps treatment liquid into the vessels and the throttle device 36 acts so that in the system comprising the vessels 2 and 4 an excess pressure builds up which is recorded on the pressure gauge 20. The pressure gauge is provided with an upper contact 21 and a lower contact 23 which can be touched by the pointer 25 of the gauge, whereupon a predetermined control circuit is closed and corresponding relays are actuated. When the pointer 25 of the gauge 20 reaches the upper contact 21, then the preset relays set the pump 18 in further activity. The pressure of the treatment liquid does not thereby rise further; on the contrary, the treatment liquid can be released through the throttle device 36 into the supply vessel 6. Thus the pressure of the treatment fluid again falls, and the pointer 25 eventually reaches the lower contact 23. The relay thereby controlled switches on the pump 18 again, so that treatment liquid is again pumped into the vessels 2 and 4 and the pressure of this liquid in the vessels is increased. This change of pressure of the treatment fluid takes place henceforth recurrently during the entire electrolytic process, and the frequency of the periodical pressure change may therefore be regulated, for example, by means of the adjustable pressure gauge 20.

The electrolytic processes in different vessels of the same apparatus are advantageously displaced at the same time with respect to one another in such a manner that the electrolytic processes are never finished in any two vessels at the same time and only one vessel at a time need be opened and filled with new material to be treated. Accordingly, after the conclusion of the electrolysis in, for example, vessel 2 the appropriate valve 22 and the valve 32 are closed and the valve 74 is opened. The valve 44 is subsequently opened and the pump 50 is switched on, which pumps the treatment fluid back through the pipelines 14, 38, 48 and 52 into the reservoir 6. After complete emptying of the vessel 2, the valves 44 and 74 are again closed and the valve 60 is opened. Subsequently the vacuum pump 66 is switched on and in the entire vessel 2 a vacuum of about 400 mm. Hg is obtained. By means of this vacuum treatment after the electrolytic process, the materials are subjected to an intensive drying; hitherto in using open vessels this drying has had to be carried out in a separate working process in an airtight closeable vessel.

After the vacuum treatment, the valve 74 is opened, and after the release of the vacuum the lid of the vessel is lifted and the treated material removed, the vessel cleaned out, new material inserted and so forth. The operation of the second vessel at the end of the respective electrolytic process is in principle exactly the same as that of the first one; the apparatus is however so arranged that these periods of use must begin first at the earliest when the vessel 2 is already again filled, closed and in operation.

The manner of working of the process according to the invention is set out below in connection with a schematic example in conjunction with FIG. 5. In FIG. 5, 160 represents an iron tube, coated with lead or with tin and which is closed above at the upper end and open at the lower end. The tube 160 is placed in the vertical position inside a volume of fluid 162 in a treatment vessel, where it is now subjected in turn to three different kinds of electrolytic treatment, during which it is attached to the positive pole and the treatment vessel to the negative pole of a direct current generator.

In the first case, neither a vacuum treatment nor a subsequent recurrent pressure change of the treatment fluid is applied. Thus, the fluid, by reason of the static pressure of the head of fluid under compression, pushes the air contained in the tube from below up to about mark D inside the tube. The result of the removal of lead or tin coating carried out in this position is that the lead or tin inside the container between the marks A and D is not attacked, but only on the outside of the container and on the inside between the marks D and E. Thus only 55% de-leading or de-tinning is obtained.

In the second case, before the beginning of the electrolytic process the treatment fluid containing the tube 160 is subjected to a vacuum, whereupon at a constant temperature following the Boyle-Mariotte gas law, the air contained in the tube expands and partly comes out from the tube. After normal pressure is again reached (opening of valves 22, 32 and 34 in the apparatus according to FIG. 1) the fluid in the tube forces the air still contained in the tube under compression up to the mark C in the inside of the tube. The subsequent lead or tin removal process has a yield of about 71%.

In the third case, which corresponds with the method of the present invention, after recovery of normal pressure following the vacuum treatment, an excess pressure is then obtained in the treatment fluid, so driving the treatment fluid further, namely up to mark B in the tube and nearly complete wetting of the surface to be treated is obtained. The pressure in the treatment fluid is furthermore according to the invention hereafter recurrently reduced and again increased, so that a washing is obtained in the tube to be de-tinned, which as well as bringing about wetting of the surface also improves the ion transport. By this process a 92% lead or tin plating is obtained by comprison with the same surface.

The schematic example of a tube closed above and open below which has just been described clearly shows the feature under discussion, namely the air-filled cavities formed amongst the compressed pieces of material. The example shows that the effectiveness of the lead or tin removal is decisively improved by the process according to the invention.

As is particularly evident from the last described schematic example, the process according to the invention is obviously applicable not only to tin removal but also with advantage to lead removal, and so the process should not be considered to be limited to de-tinning; on the contrary, the application of vacuum and the subsequent recurrent changing of pressure of the treatment fluid can with advantage be used for the removal from iron or other surface coatings of non-ferrous metals. The special embodiment of the apparatus for carrying out the invention is not to be considered as limiting; for changes and modifications are possible according to requirements in particular circumstances; for example, any desired number of treatment vessels can be used and the construction of the vessels can also be altered in various ways.

What I claim is:

1. A process for separating surface coatings of non-ferrous metals from steel plates comprising the steps of immersing the material to be treated into an electrolytic solution, subjecting said solution to a vacuum to remove most of the entrapped air from contact with said plates, removing said vacuum, and simultaneously subjecting said solution to cyclic pressure fluctuations to compress and cause movement of remaining entrapped air to increase the wetted area and passing a current through said electrolytic solution of sufficient density to separate coatings of nonferrous metals.

2. A process for separating surface coatings of non-ferrous metals from steel plates comprising the steps of introducing the material to be treated into an airtight vessel forming an electrolytic cell, filling said vessel with an electrolyte comprising an aqueous alcohol solution, said alcohol being an aliphatic alcohol selected from the group consisting of methylalcohol, ethylalcohol, and propylalcohol, the amount of said alcohol in said solution being 5–20% by volume, said solution further containing at least one alkaline substance selected from the group consisting of potash, soda and an alkaline hydroxide in an amount of 5–10% by weight, said material being immersed within said electrolyte, thereafter subjecting said solution to a vacuum to remove most of the entrapped air from contact with said plates, removing said vacuum, subjecting said solution to cyclic pressure fluctuations to compress and cause movement of remaining entrapped air to increase the wetted area and subjecting said material to an electrolysis procedure at a cell loading of 1.5 volts and 1500 amperes and raising the temperature of the electrolyte to about 60–70° C. while said material in said electrolyte is subjected to said cyclic fluctuation of pressure.

3. A process for separating surface coatings of non-ferrous metals from steel plates comprising the steps of introducing the material to be treated into an airtight vessel forming an electrolytic cell, filling said vessel with an electrolyte comprising an aqueous alcohol solution, said alcohol being an aliphatic alcohol selected from the group consisting of methylalcohol, ethylalcohol, and propylalcohol, the amount of said alcohol in said solution being 5–20% by volume, said solution further containing at least one alkaline substance selected from the group consisting of potash, soda, and an alkaline hydroxide, in an amount of 5–10% by weight, immersing said material within said electrolyte, creating a vacuum of about 400 millimeters of mercury upon said material in said solution to remove most of the entrapped air from contact with said plates, removing said vacuum, subjecting said solution to cyclic pressure fluctuations to compress and cause movement of remaining entrapped air to increase the wetted area, and subjecting said material to an electrolysis procedure at a cell loading of 1.5 volts and 1500 amperes and raising the temperature of the electrolyte to about 60–70° C. while said material in said electrolyte is subjected to said cyclic fluctuation of pressure.

4. A process for separating surface coatings of nonferrous metals from steel plates comprising the steps of introducing the material to be treated into an airtight vessel forming an electrolytic cell, filling said vessel with an electrolyte comprising an aqueous alcohol solution, said alcohol being an aliphatic alcohol selected from the group consisting of methylalcohol, ethylalcohol, and propylalcohol, the amount of said alcohol in said solution being 5–20% by volume, said solution further containing at least one alkaline substance selected from the group consisting of potash, soda, and an alkaline hydroxide in an amount of 5–10% by weight, immersing said material within said electrolyte solution, subjecting said solution to a vacuum to remove most of the entrapped air from contact with said plates, removing said vacuum, subjecting said solution to cyclic pressure fluctuations to compress and cause movement of remaining entrapped air to increase the wetted area, subjecting said material to an electrolysis procedure at a cell loading of 1.5 volts and 1500 amperes and raising the temperature of the electrolyte to about 60–70° C. while said material in said electrolyte is subjected to said cyclic fluctuation of pressure, removing the electrolyte from the vessel after the electrolysis procedure has been completed, and subjecting the treated material to a vacuum to dry the material.

5. A process for the recovery of tin contained in scrap tin plate comprising the steps of introducing the scrap tin plate into an airtight vessel forming an electrolytic cell, filling said vessel with an electrolyte comprising an aqueous alcohol solution, said alcohol being an aliphatic alcohol selected from the group consisting of methylalcohol, ethylalcohol, and propylalcohol, the amount of said alcohol in said solution being 5–20% by volume, said solution further containing at least one alkaline substance selected from the group consisting of potash, soda, and an alkaline hydroxide in an amount of 5–10% by weight, immersing said scrap within said electrolyte, subjecting said electrolyte solution to a vacuum to remove most of the entrapped air from contact with said plates, removing said vacuum, subjecting said solution to cyclic pressure fluctuations to compress and cause movement of remaining entrapped air to increase the wetted area, and subjecting said material to an electrolysis procedure at a cell loading of 1.5 volts and 1500 amperes and raising the temperature of the electrolyte to about 60–70° C. while said scrap in said electrolyte is subjected to said cyclic fluctuation of pressure.

6. A process for the recovery of tin contained in scrap tin plate comprising the steps of introducing the scrap tin plate into an airtight vessel forming an electrolytic cell, filling said vessel with an electrolyte comprising an aqueous alcohol solution, said alcohol being an aliphatic alcohol selected from the group consisting of methylalcohol, ethylalcohol, and propylalcohol, the amount of said alcohol in said solution being 5–20% by volume, said solution further containing at least one alkaline substance selected from the group consisting of potash, soda, and an alkaline hydroxide in an amount of 5–10% by weight, immersing said scrap within said electrolyte solution, subjecting said electrolyte solution to a vacuum to remove most of the entrapped air from contact with said plates, removing said vacuum, subjecting said solution to cyclic pressure fluctuations to compress and cause movement of remaining entrapped air to increase the wetted area, subjecting said material to an electrolysis procedure at a cell loading of 1.5 volts and 1500 amperes and raising the temperature of the electrolyte to about 60–70° C. while said scrap in said electrolyte is subjected to said cyclic fluctuation of pressure, removing the electrolyte solution from the vessel after the electrolysis procedure has been completed and subjecting the treated scrap to a vacuum to dry the scrap.

References Cited by the Examiner
UNITED STATES PATENTS

| | | | |
|---|---|---|---|
| 1,263,314 | 4/18 | Emanuel | 204—278 |
| 2,110,487 | 3/38 | Johnstone | 204—277 |
| 2,229,073 | 1/41 | Gregory | 204—122 |
| 2,588,566 | 3/52 | Peaslee | 204—146 |
| 2,796,394 | 6/57 | Schaefer | 204—146 |
| 2,944,957 | 7/60 | Keidel | 204—275 |
| 2,972,573 | 2/61 | Capacciui | 204—275 |
| 3,066,084 | 11/62 | Osterman et al. | 204—145 |

JOHN H. MACK, *Primary Examiner.*

JOHN R. SPECK, WINSTON A. DOUGLAS,
*Examiners.*